(12) United States Patent
Bush et al.

(10) Patent No.: US 10,382,261 B2
(45) Date of Patent: Aug. 13, 2019

(54) SYSTEMS AND METHODS FOR MANAGED SERVICES PROVISIONING USING SERVICE-SPECIFIC PROVISIONING DATA INSTANCES

(71) Applicant: Open Text GXS ULC, Halifax (CA)

(72) Inventors: Gregory Frederick Bush, Gaithersburg, MD (US); Ricardo Ceppi, Gaithersburg, MD (US); Tom Gordon, Raleigh, NC (US); John Theodore Radko, Germantown, MD (US)

(73) Assignee: Open Text GXS ULC, Halifax (CA)

( * ) Notice: Subject to any disclaimer, the term of this patent is extended or adjusted under 35 U.S.C. 154(b) by 363 days.

(21) Appl. No.: 15/223,192

(22) Filed: Jul. 29, 2016

(65) Prior Publication Data

US 2017/0033987 A1 Feb. 2, 2017

Related U.S. Application Data

(60) Provisional application No. 62/198,510, filed on Jul. 29, 2015.

(51) Int. Cl.
*G06Q 10/10* (2012.01)
*H04L 12/24* (2006.01)
(Continued)

(52) U.S. Cl.
CPC ...... *H04L 41/0806* (2013.01); *G06F 3/04847* (2013.01); *G06Q 10/10* (2013.01);
(Continued)

(58) Field of Classification Search
CPC ............. H04L 41/0803; H04L 41/0806; H04L 41/0233; H04L 41/0889; H04L 41/22; H04L 67/32; H04L 67/34
See application file for complete search history.

(56) References Cited

U.S. PATENT DOCUMENTS 7,100,149 B1 * 8/2006 Venkatesan ............. G06F 9/465
717/108
7,111,053 B1 * 9/2006 Black .................. H04L 41/0806
709/220

(Continued)

OTHER PUBLICATIONS

Wikipedia, "JSON," 2015, retrieved on Nov. 26, 2018 from The Wayback Machine Internet Archive at <url>:https://web.archive.org/web/20150624172631/https://en.wikipedia.org/wiki/Json#JSON_Schema. (Year: 2015).*

(Continued)

*Primary Examiner* — Thuy Dao
*Assistant Examiner* — Stephen D Berman
(74) *Attorney, Agent, or Firm* — Sprinkle IP Law Group

(57) ABSTRACT

A technical solution for significantly improving the scalability of the capability of an electronic information exchange platform is disclosed. Services provided by the platform may be described in a uniform way via service-specific provisioning descriptors. To provision services for a client system, a managed services provisioning system provides a service configuration interface through which a service associated with a tuple of a particular sender, receiver, and document type can be selected for further configuration. A service provisioning interface is dynamically generated for obtaining service-specific provisioning information from a user for generating a service-specific provisioning data instance that can be deployed to a backend system. At runtime, the backend system utilizes the service-specific provisioning data instance to provide the provisioned service for a client system. In this way, a variety of services can be efficiently provisioned for a diverse set of clients in a scalable, streamlined, and cost-effective manner.

20 Claims, 9 Drawing Sheets

(51) Int. Cl.
*H04L 29/08* (2006.01)
*G06F 3/0484* (2013.01)

(52) U.S. Cl.
CPC ...... *H04L 41/0233* (2013.01); *H04L 41/0889* (2013.01); *H04L 41/22* (2013.01); *H04L 67/32* (2013.01); *H04L 67/34* (2013.01)

(56) References Cited

U.S. PATENT DOCUMENTS

| | | | | |
|---|---|---|---|---|
| 8,200,823 | B1* | 6/2012 | Zhang | H04L 41/5041 709/223 |
| 2005/0050183 | A1* | 3/2005 | Hansen | H04L 41/22 709/223 |
| 2005/0149881 | A1* | 7/2005 | Proulx | G06F 3/0481 715/853 |
| 2006/0031225 | A1* | 2/2006 | Palmeri | G06F 17/30566 |
| 2006/0248121 | A1* | 11/2006 | Cacenco | G06F 8/71 |
| 2009/0282401 | A1* | 11/2009 | Todorova | G06F 8/61 717/175 |
| 2012/0066670 | A1* | 3/2012 | McCarthy | G06F 9/5072 717/169 |
| 2012/0225415 | A1* | 9/2012 | Vento | G09B 7/00 434/350 |
| 2015/0263891 | A1* | 9/2015 | Baugher | H04L 41/0806 370/254 |
| 2018/0083830 | A1* | 3/2018 | Pendleton | H04L 67/20 |

OTHER PUBLICATIONS

Lian-Jie Zhang et al., "A manageable Web services hub framework and enabling technologies for e-sourcing," 2002 [retrieved on Mar. 13, 2019], IEEE International Conference on Systems, Man and Cybernetics, pp. 1-6, downloaded from the Internet at <url>:https://ieeexplore.ieee.org. (Year: 2002).*

Wolfgang Theilmann et al., "Multi-level SLA Management for Service-Oriented Infrastructures," 2008 [retrieved on Mar. 13, 2019], Lecture Notes in Computer Science, vol. 5377, pp. 324-335, downloaded from the Internet at <url>:https://link.springer.com (Year: 2008).*

Kyuchang Kang et al., "Management Agent for OSGi-based Healthcare Application Using Portable Information Terminal," 2008 [ retrieved on Mar. 13, 2019], 10th International Conference on Advanced Communication Technology, pp. 1652-1657, downloaded from the Internet at <url>:https://ieeexplore.ieee.org. (Year: 2008).*

Summons to Attend Oral Proceedings Pursuant to Rule 115(1) issued for European Patent Application No. EP16182045.1, mailed Aug. 2, 2018, 9 pages.

Anonymous: "Generating a Deployment Descriptor from your Service Classes," Feb. 6, 2015, XP55495432, [Retrieved on Jul. 26, 2018, from <<URL:https://web.archive.org/web/20150206001257/http://soapuser.com: 80 /ngx_26jul01.html>>].

Anonymous: "Getting Started I SOAP and WSDU," Jun. 11, 2015, XP55495431, [Retrieved on Jul. 26, 2018 from <<URL:https:Hweb.archive.org/web/20150611085059/https://www.soapui.org/soap-and-wsdl/getting-started.html>>].

Sriganesh et al., "Mastering Enterprise JavaBeans 3.0," Jan. 1, 2006, XP055495029, US ISBN: 978-0-471-78541-5 [Retrieved from <<URL:https://cdn.ttgtmedia.com/tss/static/books/wiley/masteringEJB3/downloads/MasteringEJB4thEd.pdf>>].

European Search Report for European Patent Application No. 16182045.1, dated Dec. 12, 2016, 9 pgs.

Haitof, Houssam, "A Framework for Autonomic Service-based Resource Management Using a Semantic Approach," Nov. 25, 2011, retrieved from http://mediatum.ub.tum.de/doc/1081798/document.pdf on Nov. 21, 2016, pp. 65-122.

Apache Brooklyn Developers: "Apache Brooklyn Versions," May 13, 2016, retrieved from https://brooklyn.apache.org/meta/versions.htm on Dec. 1, 2016, 3 pgs.

Office Action for European Patent Application No. 16182045.1, dated Feb. 7, 2018, 11 pgs.

* cited by examiner

FIG. 5

SYSTEMS AND METHODS FOR MANAGED SERVICES PROVISIONING USING SERVICE-SPECIFIC PROVISIONING DATA INSTANCES

CROSS-REFERENCE TO RELATED APPLICATION(S)

This is a conversion of, and claims a benefit of priority from U.S. Provisional Application No. 62/198,510, filed Jul. 29, 2015, which is fully incorporated by reference herein in its entirety, including the appendixes.

TECHNICAL FIELD

This disclosure relates generally to supply chain integration, synchronization and collaboration solutions. More particularly, this disclosure relates to supply chain managed software. Even more particularly, this disclosure relates to systems, methods, and computer program products for managed services provisioning using service-specific provisioning data instances in a network computing environment.

BACKGROUND OF THE RELATED ART

Today, enterprises and entities alike recognize the tremendous cost savings by exchanging business documents with their trading partners via an electronic communication method referred to as the Electronic Data Interchange (EDI). An electronic information exchange platform may provide various services to networked enterprise systems so that documents such as invoices, purchase orders, etc. can be exchanged over a network, for instance, using the EDI. Skilled artisans appreciate that such an electronic information exchange platform has the necessary resources (e.g., hardware, software, personnel, etc.) to provide services that enable the real-time flow or exchange of information electronically in a network environment.

Given the vast amounts of data involved in the real-time flow or exchange of information electronically in a network environment, scaling up the capability of an electronic information exchange platform to perform such services in a secure, fast, and reliable manner can be problematic and cost prohibitive.

One reason why scaling up the capability of an electronic information exchange platform can be problematic and cost prohibitive is that complex and time consuming manual coding and configuration is needed for each enterprise system (client) that wants to connect to the electronic information exchange platform and for each service (which is managed and provided by the electronic information exchange platform) that each client system wants to use. Complicating the matter is that these client systems can be very diverse and may be located in various geographical and/or jurisdictional locations, with disparate formats, system/application/device requirements. Consequently, a technical solution is needed to significantly improve the scalability of the capability of an electronic information exchange platform, particularly with respect to provisioning services to networked client systems.

SUMMARY OF THE DISCLOSURE

Embodiments disclosed herein provide a technical solution to provisioning managed services provided by an electronic information exchange platform. In the context of this disclosure, the term "provisioning" refers to supplying or providing managed services, each of which requires configuration. To this end, the process of provisioning a managed service includes configuration of that managed service.

In some embodiments, the technical solution is realized in a managed services provisioning system embodied on at least one server machine running the electronic information exchange platform in a network environment. The managed services provisioning system, through one or more computer machines, collects provisioning data for each managed service in a standardized or unified format. Such provisioning data describes the service-specific data to be collected. In this context, the term "provisioning data" can be generally referred to herein as a "data card" or, technically, a "service-specific provisioning data instance" (SSPDI).

In this disclosure, a SSPDI can be considered a unit, a bundle, or a logical set of information collected via a service provisioning interface (SPI) of the managed services provisioning system. The structure of the SSPDI may vary from implementation to implementation. As an example, one embodiment of a SSPDI may implement a particular JavaScript Object Notation (JSON) schema. JSON is an open standard format that uses human-readable text to transmit data objects consisting of attribute-value pairs. Skilled artisans appreciate that JSON schemas are extensible. The particular JSON schema for the SSPDI feature is extended with significant changes and additions to meet the functional and visual requirements of the special service provisioning interface of the managed services provisioning system. In this example implementation, SSPDIs are special JSON documents.

In some embodiments, a managed services provisioning system may include a service registry. The service registry may store registration information for a plurality of services provided by disparate backend systems. Each service of the plurality of services may have a unique set of requirements for processing incoming information, for example, acceptable data formats, validation rules, etc.

The managed services provisioning system may receive a service-specific provisioning descriptor associated with a service from a backend system, store the service-specific provisioning descriptor in a service registry, and register the service in the service registry. When a service is configured, for instance, for a new enterprise customer (e.g., an entity such as a company) of the managed services provisioning system, a service provisioning interface may be dynamically generated for entry of service-specific provisioning information based at least in part on the service-specific provisioning descriptor associated with the service. A SSPDI can then be generated using the service-specific provisioning information received via the service provisioning interface.

This SSPDI (and any other SSPDIs for this client system) can be stored in a SSPDI store (which, in one embodiment, can be implemented in a database), for instance, in a staging environment until deployment. As skilled artisans can appreciate, each SSPDI generated and stored in the staging environment may go through a review and approval process for quality assurance and/or compliance reasons.

Once approved, the SSPDI can be deployed on the backend system of the electronic information exchange platform that provides the requested service. The backend system is operable to provide the service to the client system over a network by using the SSPDI for the service to process information received from the client system. This provisioning process can be repeated for each service requested for the client system. That is, as each service of the set of services is configured for the client system (e.g., via a service configuration interface provided by the managed services provisioning system), a corresponding SSPDI is generated. All the SSPDIs for a client system thus generated for the services to be used by the particular client system can be deployed to the backend systems that provide the requested services.

The services may be used by the client systems to communicate with networked systems associated with a plurality of entities through the electronic information exchange platform. Such networked systems can all be external to the managed services provisioning system and may be distributed across various geographic locations, for instance, across the globe.

After deployment, the managed services provisioning system can pull from a backend system a SSPDI for a particular service configured for a particular client system, generate a service provisioning interface for the SSPDI, present the service provisioning interface on a user device (e.g., a service developer computer), receive modified service-specific provisioning information via the service provisioning interface, update the SSPDI for the service based on the modified service-specific provisioning information received via the service provisioning interface, and send the SSPDI updated for the service to the backend system. The backend system can then provide the service to the particular client system by using the modified SSPDI that has been updated for the service to process information received from the particular client system.

In one embodiment, the managed services provisioning system may comprise at least one processor, at least one non-transitory computer-readable storage medium, and stored instructions translatable by the at least one processor to perform a method substantially as described herein. Another embodiment comprises a computer program product having at least one non-transitory computer-readable storage medium storing instructions translatable by at least one processor to perform a method substantially as described herein.

Numerous other embodiments are also possible.

Embodiments disclosed herein can provide many advantages. For example, the managed services provisioning system can expedite launching a managed service. Traditionally, a request for a new managed service may be submitted to a system. The request is placed in a queue for processing. The request may stay in the queue for long periods of time, depending upon the workload of the person or group of people (e.g., service developer(s)) assigned to configure managed services in the system. Then, the service developer(s) would design, develop, and implement a custom user interface (e.g., a web-based user interface) for the managed service to collect data needed for the managed service, store the data in appropriate locations, and keep track of the stored data. Developing the custom user interface for the managed service may take the service developer(s) weeks or even longer, depending upon the complexity of the managed service. Furthermore, the production of a managed service traditionally must synchronize with the deployment per a predetermined schedule, which can be as long as a quarter (quarterly deployment), causing further delay.

In contrast, with embodiments disclosed herein, a service-specific provisioning descriptor can be used to express the needs/requirements of a managed service and, as a service is configured for a client system, a service provisioning interface can be dynamically generated using the service-specific provisioning descriptor. The system may consume (e.g., parse, examine, analyze, etc.) the service-specific provisioning descriptor to generate the service provisioning interface, providing an interactive visual representation for display on a user device. Using service-specific provisioning information collected via the service provisioning interface, a SSPDI can be generated, stored, reviewed, corrected if necessary, and approved for deployment. Once deployed to a backend system, the backend system can consume (e.g., parse, examine, analyze, etc.) the SSPDI to understand how to perform the requested service for the particular client system for which the SSPDI for the particular service is generated. In this way, embodiments of the managed services provisioning system can streamline and automate the managed services provisioning process, eliminating unnecessary delays, significantly improving the scalability of the capability of the underlying electronic information exchange platform, shielding client systems from complex and complicated manual coding and configuration efforts, and reducing costs.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 5 depicts a diagrammatic representation of an example of a dynamically generated service provisioning interface configured for collecting service-specific provisioning information according to some embodiments.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
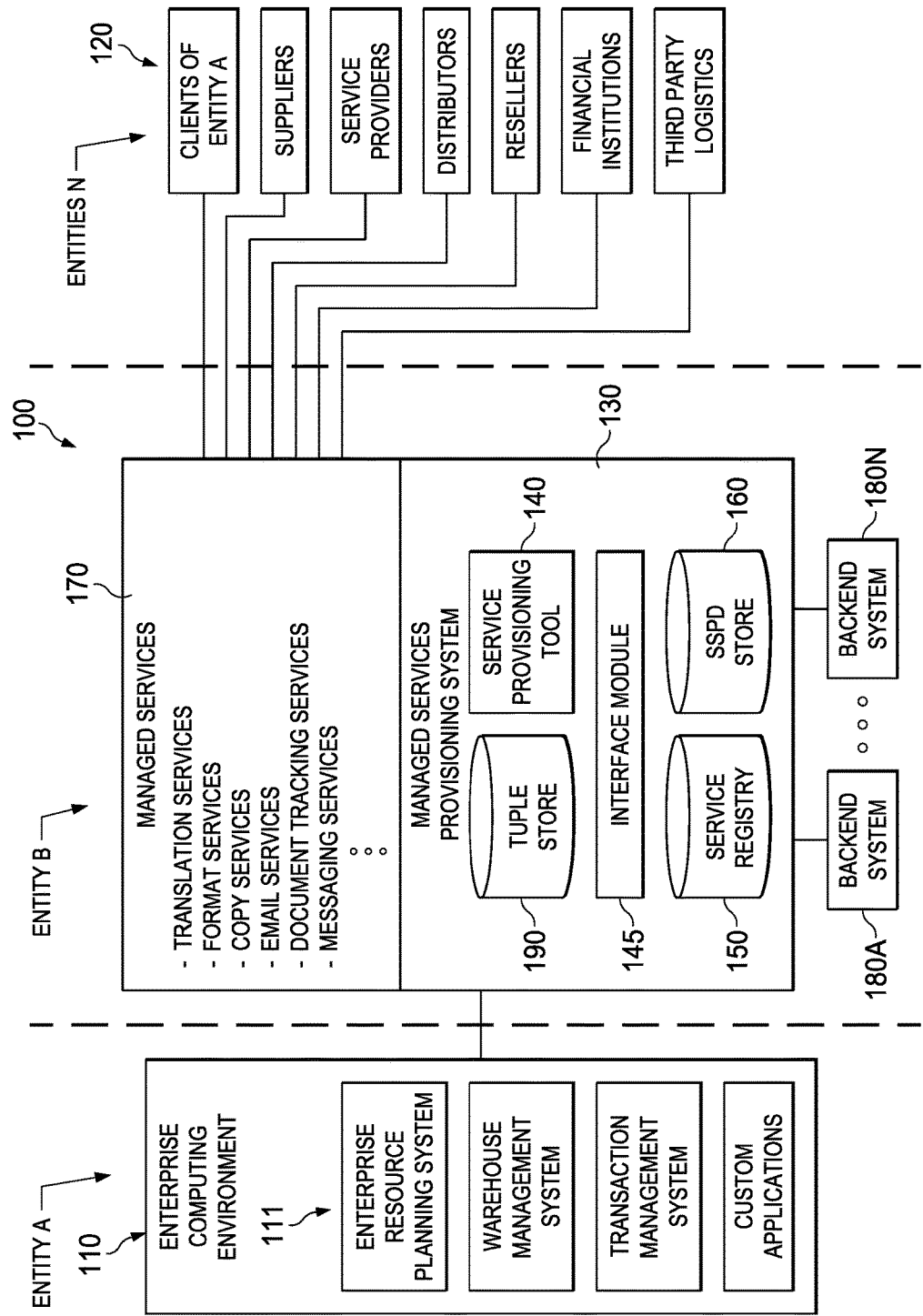
FIG. 1 depicts a diagrammatic representation of an example of a network environment in which embodiments of a managed services provisioning system may be implemented.

FIG. 1 depicts a diagrammatic representation of an example of network environment 100 in which an electronic information exchange platform having managed services provisioning system 130 operates. The OpenText GXS Trading Grid® ("Trading Grid") represents an example of an electronic information exchange platform.

The Trading Grid operating in network environment 100 has the necessary resources (e.g., hardware, software, personnel, etc.) to provide managed services that enable the real-time flow or exchange of information electronically in network environment 100 in a secure, fast, and reliable manner, between and among disparate operating units, regardless of their standards preferences, spoken languages, or geographic locations. In this disclosure, an operating unit may represent a company, a corporation, an enterprise, an entity, or a division thereof (which is collectively referred to herein as an "entity"). Examples of network environment 100 may include a distributed computer network or a cloud-based computing environment. Non-limiting examples of managed services may include translation services, format services, copy services, email services, document tracking services, messaging services, document transformation services (for consumption by different computers), regulatory compliance services (e.g., legal hold, patient records, tax records, employment records, etc.), encryption services, data manipulation services (e.g., validation), etc.

The Trading Grid operates to facilitate the real-time flow or exchange of information between disparate entities regardless of standards preferences, spoken languages, or geographic locations. The Trading Grid may be embodied on server machines that support the electronic communication method (e.g., EDI) used by various computers (i.e., client systems of the Trading Grid) that are independently owned and operated by different entities. In some embodiments, data formats supported by the Trading Grid may include EDI, Extensible Markup Language (XML), RosettaNet, EDI-INT, flat file/proprietary format, etc. Supported network connectivity may include dial-up, frame relay, AS2, leased line, Internet, etc. Delivery methods supported by the Trading Grid may include store-and-forward mailbox, event-drive delivery, etc. Supported transport methods may include Hypertext Transfer Protocol (HTTP), File Transfer Protocol (FTP), and Simple Mail Transfer Protocol (SMTP), etc. Network security protocols supported by the Trading Grid may include Secure Socket Layer (SSL), Secure/Multipurpose Internet Mail Extensions (S/MIME), Internet Protocol Security (I PSEC), Virtual Private Network (VPN), Pretty Good Privacy (PGP) encryption protocol, etc.

In the example of FIG. 1, managed services provisioning system 130 may be configured to provide and manage (orchestrate) a very large number of services 170 (e.g., 50 or more) performed by backend systems 180A . . . 180N operating in network environment 100. Managed services provisioning system 130 may also be configured to provide enterprise customers such as Entity A with access to services 170. Entity A may own and operate enterprise computing environment 110 which is separate and independent of network environment 100 owned and operated by Entity B. From the perspective of Entity B, Entity A is an enterprise customer and systems 111 of Entity A that utilize services 170 provided by Entity B are client systems of managed services provisioning system 130. Client systems 111 operating in enterprise computing environment 110 may use services 170 to communicate with various systems and/or devices operating in computing environments 120 owned and operated by Entities N. Examples of services 170 may include, but are not limited to, translation services, format services, copy services, email services, document tracking, messaging, document transformation (for consumption by different computers), regulatory compliance (e.g., legal hold, patient records, tax records, employment records, etc.), encryption, data manipulation (e.g., validation), attribute injection, etc.

Each service may have a unique or different set of data collection requirements in terms of how to configure a client system such that the client system can use the service. Historically, in the conventional art, each backend system providing a service through a process platform has to have its own data collection interface for collecting, via the process platform, information needed from a client system to bring that client system online to use the service. Understandably, as the number of services and/or the number of client systems increase, this individualized service approach does not scale well.

Another approach attempts to create a central point of data collection through a more integrated process platform. However, this centralized approach still requires a custom user interface be written for each service provided by a backend system. For example, each time a new customer joins a process integration platform, the customer may wish to sign up for a variety of services provided by the process integration platform. Suppose the customer signs up for 50-60 services. For each of those services, a custom user interface has to be developed, configured, tested, and implemented by a developer or a team of developers. This manual process can be tedious, time consuming, and error prone.

Embodiments disclosed herein take a unified approach using a standardized logical unit of information referred to herein as a data card or service-specific provisioning data instance (SSPDI) for provisioning each service, advantageously eliminating the need for developers to manually creating custom user interfaces and the need for backend systems to use such custom user interfaces to collect data from client systems of customers in order to configure services for them. In this context, the term "provisioning" used in this disclosure generally refers to supplying or providing managed services, each of which requires configuration. More particularly, "service-specific provisioning" refers to the action taken to prepare/configure a specific service such that a backend system of the Trading Grid can provide or supply that specific service to a particular client system. To this end, the process of provisioning a managed service includes configuration of that managed service and steps taken by the managed services provisioning system beyond service configuration.

In some embodiments, this unified approach can include a unique way in how a new service is processed at a managed services provisioning system, as explained below with reference to FIGS. 1-2, and a unique way in how a service requested by a client system of an enterprise customer is provisioned, as explained below with reference to FIGS. 1 and 3.

Figure 2:
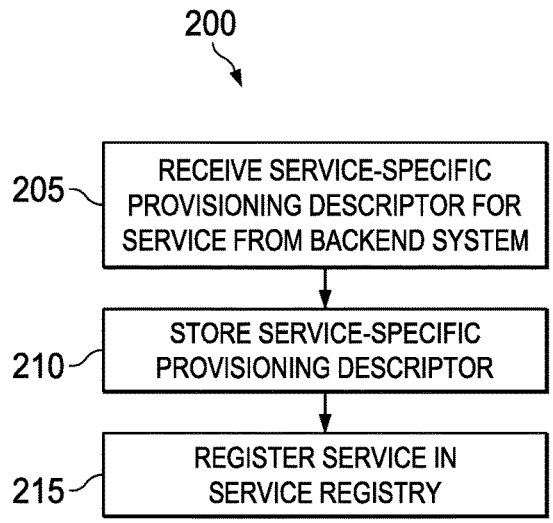
FIG. 2 depicts a flow chart illustrating an example of a method for processing a new service at a managed services provisioning system according to some embodiments.

Referring to FIGS. 1 and 2, managed services provisioning system 130 implementing method 200 may receive a service-specific provisioning descriptor associated with new service 170 from backend system 180A (step 205). The service-specific provisioning descriptor describes what is required by a service from a provisioning and configuration standpoint. The service-specific provisioning descriptor may be created by a programmer for backend system 180A as a channeling mechanism to ensure that a human user (who may be an administrative user of managed services provisioning system 130 and not a programmer or a subject matter expert in service provisioning) can understand what the input obligations are. The service-specific provisioning descriptor may implement a service-specific provisioning architecture or framework that includes a service provisioning interface (SPI) and that supports integration with a managed services provisioning process by having service registry 150. Managed services provisioning system 130 may store the received service-specific provisioning descriptor (SSPD) in service registry 150, or SSPD store 160 (step 210) and register new service 170 with service registry 150 (step 215). New service 170 can be registered with managed services provisioning system 130 independently of any request for service 170 from any of client systems 111.

As a non-limiting example, service registry 150 may be configured for maintaining the following service registration information:
  serviceCode: a unique identifier for a service that is easily recognizable by a human.
  parameterSchemaURI: a universal resource identifier (URI) of a particular JSON schema that describes the provisioning data a service requires.
  provisioningURL: a SPI-compliant endpoint URL to use for provisioning a service.
  validationURL: an optional SPI-compliant endpoint URL to use for validation beyond what can be performed using a JSON schema.
  dataCollectionCategory: each data collection category describes a manner in which to collect provisioning data for a service. These can include:
    Tuple: provisioning data is collected for individual tuples (in which sender, receiver and docType are variable).
    Electronic Data Interchange (EDI) address: provisioning data is collected for individual EDI addresses (in which sender is used for the EDI address, the reserved value "N/A" is used for receiver and docType).
    Solution: provisioning data is collected for an entire solution (in which the reserved value "N/A" is used for sender, receiver and docType).
    None: no provisioning data is collected.

In computing, tuples can be implemented in functional programming languages as a set of particular attributes (e.g., sender, receiver, docType) with values that can be passed from one program to another, for instance, in a data flow. To this end, a tuple may also be referred to as a data flow tuple. Tuples may be defined for a client system, trading partner, docType, direction, or solution ID. Each SSPDI may be tied to a particular tuple (because the service provisioning is specific to how a service provided by a particular backend system is to be performed for a particular client system, for instance, sending a purchase order on behalf of Entity A to its trading partner, Entity N). A tuple may have globally unique first class attributes and may have an itinerary. In this disclosure, an itinerary can be an XML document that describes a processing model for processing a particular docType. For example, processing a certain type of document may require performing a set of services on the document. Each of the set of services, which is registered with managed services provisioning system 130 as described above, may have a service-specific provisioning descriptor that is used in the process of provisioning the tuple for a specific service as part of a solution. A tuple may also be associated with a retention policy. In some embodiments, multiple tuples may be managed using the same retention policy (e.g., a wildcard or a default retention policy). Multiple tuples may have the same retention policy regardless of receiver, sender, or document type. Managed service provisioning system 130 may store tuples in tuple store 190.

The provisioning data a service requires at run-time may be referred to as service-specific provisioning parameter or service parameter. For this reason, SSPD store 160 may also be referred to as a service parameter store (SPS) or a service-specific provisioning definitions store. Although the naming convention may vary from implementation to implementation, the data structure utilized by SSPD store 160 describes and stores a value, which can be a single value or a complex, structured value, of a service parameter particular to a service. An authorized user of managed services provisioning system 130 may be permitted to edit the service parameter using service provisioning tool 140 (also referred to as a renderer). To support all possibilities in a generic fashion, a JSON string can be used for the value which is described by a JSON schema, referred to as the service parameter schema.

The service parameter schema is uniquely identified by a parameter schema URI, which includes a version identifier. The parameter schema URI should be a valid URI which can be used to retrieve the schema, in any of the supported run-time environments. In one embodiment, a schema repository may be used for this purpose.

Service provisioning tool 140 may comprise a software module which utilizes a service-specific provisioning descriptor to generate (e.g., in real-time) a visual representation for display, via a user interface, on a user's device. In one embodiment, the visual representation may be generated in the HyperText Markup Language (HTML) that can be translated and rendered by a browser running on the user's device. A service may declare, through the service-specific provisioning descriptor, what information is needed to configure the service. The needed information may include validation rules, fields, and labeling (e.g., for the fields), etc.

Below is a non-limiting example of how a service-specific provisioning descriptor may be defined using a JSON schema:

```
{
    "type": "array",
    "minItems": 1,
    "maxItems": 1,
    "items": {
        "properties": {
            "sender": {"type": "string", "minLength": 1 },
            "receiver": {"type": "string", "minLength": 1 },
            "docType": {"type": "string", "minLength": 1 },
            "href": {
                "type": "string",
                "format": "uri",
                "description": "The URI to the parameter value. Relative URIs are allowed."
            }
        },
        "required": ["sender", "receiver", "docType", "href" ]
    }
}
```

A backend system providing a service may choose to delegate the provisioning to a generic provisioning service. For this reason, the serviceCode can be a parameter in all operations.

In some embodiments, the SPI can be a RESTful application programming interface (API) with support for various operations such as search, create, read, update, delete, and validate operations (which are also referred to as SCRUD-V operations). Thus, services may choose to implement:

All SCRUD-V operations

Only the SCRUD operations (provisioning only, validation is not required)

Only the V operation (provisioning is delegated, validation is required)

None of the operations (provisioning is delegated, validation is not required)

When choosing to implement only part of the SPI API, a service should return the HyperText Transfer Protocol (HTTP) status "501 Not Implemented" for the operations that are not implemented.

Figure 3:
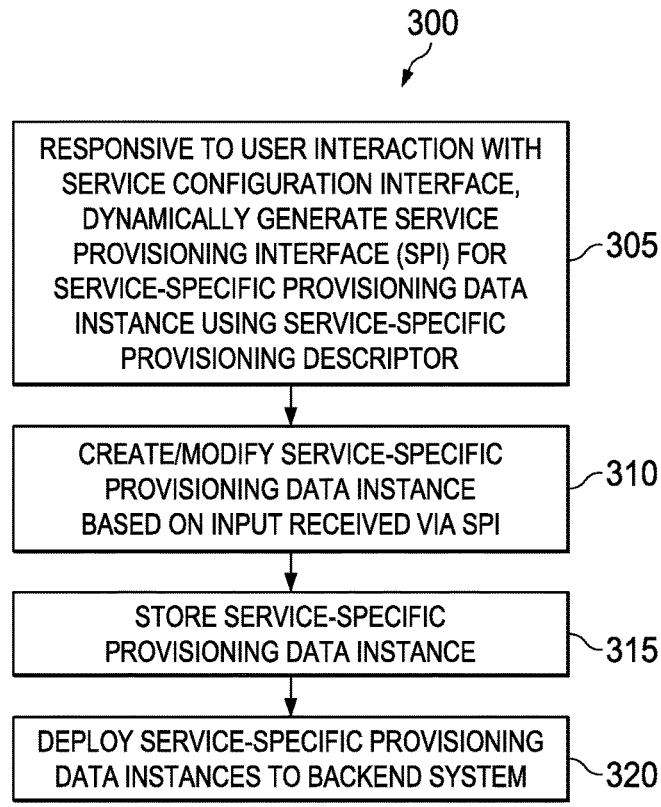
FIG. 3 depicts a flow chart illustrating an example of a method for provisioning a service managed by a managed services provisioning system disclosed herein according to some embodiments.

Referring to FIGS. 1 and 3, once service 170 is registered, it is made available to client systems of managed services provisioning system 130. To this end, referring to FIG. 4 which depicts a diagrammatic representation of an example embodiment of service configuration interface 400. An authorized user (e.g., an implementer, a service developer, a technician, a service administrator, etc.) may access service configuration interface 400 to set up one or more services for at least one client system 111 operating in enterprise computing environment 110. Service configuration interface 400 may comprise Tuple Grid 401 for displaying tuples 410a . . . 410n for a solution. As each service (which is defined in an itinerary for a tuple, for instance, itinerary 420 specifies that services 420 are to be used for processing tuple 410b of document type 460 from a client system at customer address 440 to a trading partner's system at partner address 450) is selected and configured, and responsive to user interaction with service configuration interface 400, a corresponding service provisioning interface (e.g., SPI 500 shown in FIG. 5) may be dynamically generated (step 305), for instance, by interface module 145 of managed services provisioning system 130.

Figure 4:
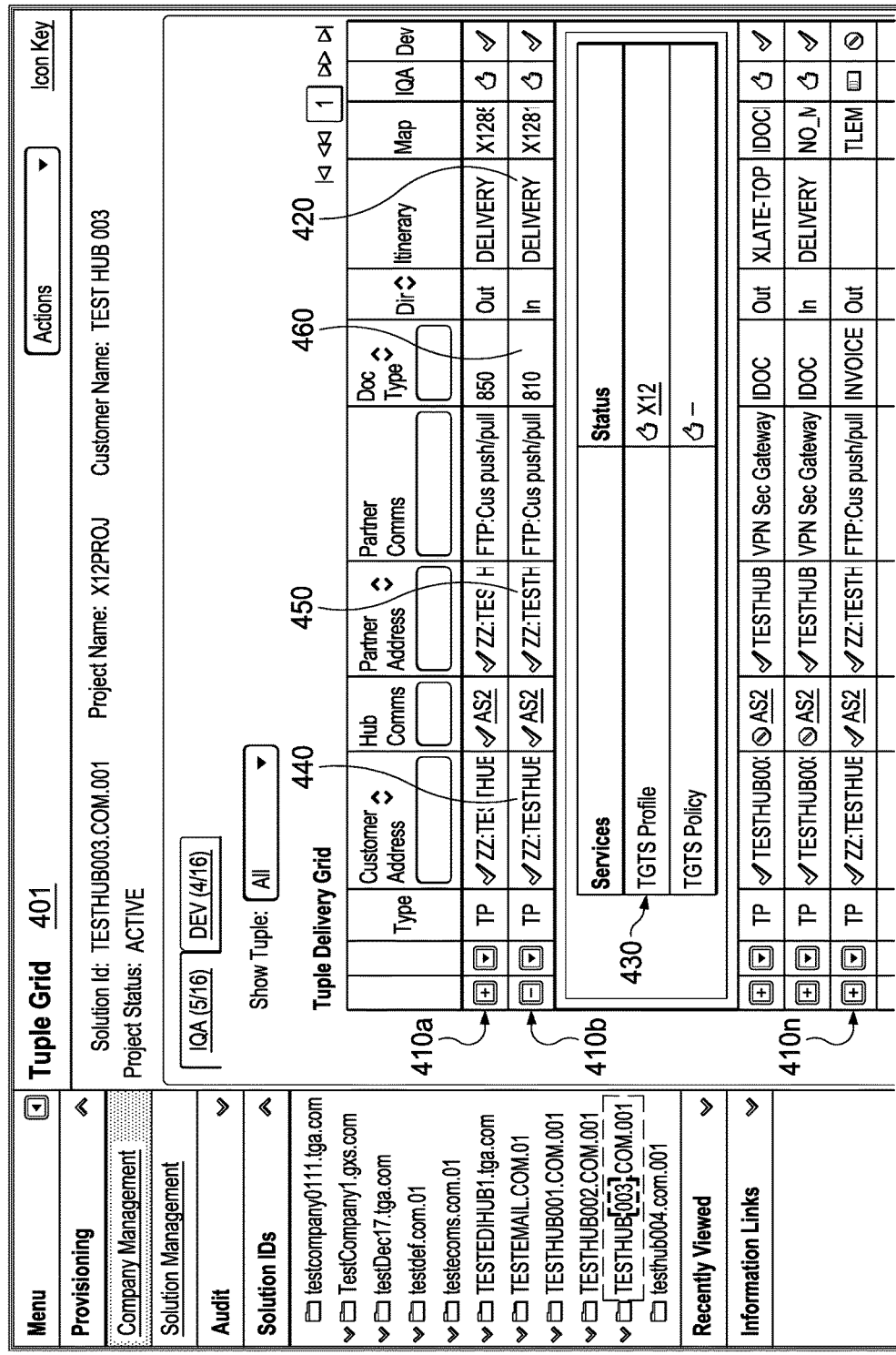
FIG. 4 depicts a diagrammatic representation of an example of a user interface for service configuration according to some embodiments.

As illustrated in FIG. 4, an authorized user may select one of many tuples 410a to 410n for configuring a particular service specified for the tuple. In the example of FIG. 4, a user interface element such as an icon with a plus "+" symbol may be associated with an expansion function in which, upon selection of the "+" symbol, Tuple Grid 401 is expanded to display all of the services associated with the particular tuple per the tuple's itinerary (e.g., the Trading Grid Translation Service or TGTS Profile service and the TGTS Policy service of services 430 specified in itinerary 420 for tuple 410b). The user may then configure or edit one or more of the services by clicking on a hyperlink for the service or the status, triggering an SPI to be displayed. The SPI may be a standardized interface in which any service can implement. All SPI endpoints may be treated the same by the system regardless of service(s) being configured this way.

Figure 5:
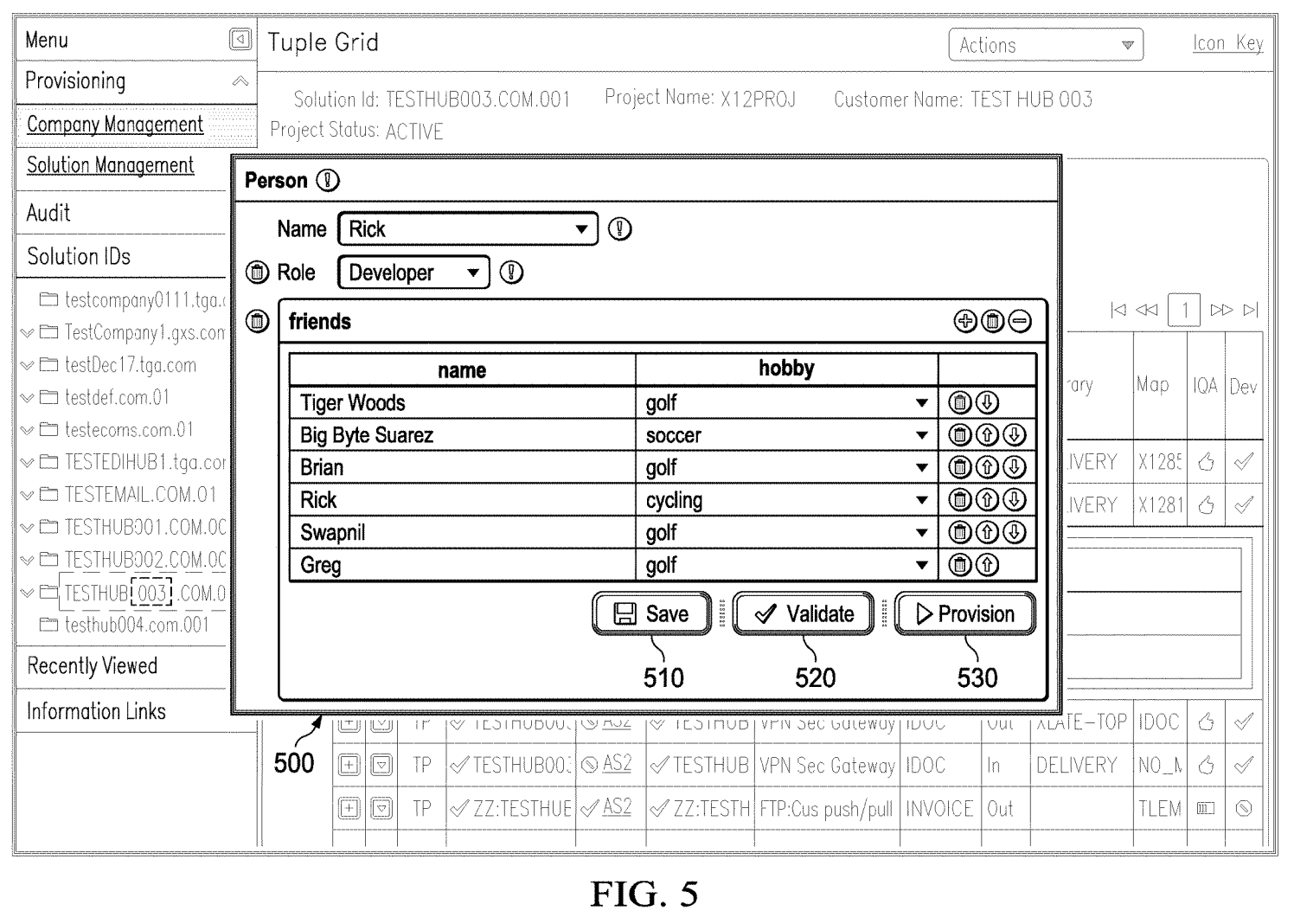

Referring to FIG. 5, in one embodiment SPI 500 may be dynamically generated by interface module 145 using a service-specific provisioning descriptor that is associated with the selected service under configuration (see service configuration interface 400 shown in FIG. 4) and that is stored in SSPD store 160. As illustrated in FIG. 5, SPI 500 is dynamically generated responsive to user action via service configuration interface 400 and based on the service schema of a service thus selected. SPI 500 may contain input fields particular to the service selected via service configuration interface 400 for further configuration. The input fields can be implemented in many ways, for instance, a text box, multiple choice, or radio buttons. Managed services provisioning system 130 implementing services provisioning method 300 may collect user input via this dynamically generated SPI 500 and, based on the collected user input, create a SSPDI for the service (step 310). The SSPDI thus created can then be stored (e.g., via "Save" button 510 associated with a persist function) in SSPD store 160 (step 315) and/or validated (e.g., via "Validate" button 520 associated with a validation function) in preparation for deployment (e.g., via "Provision" button 530 associated with a deployment function) to backend system 180A, which provides the requested service. All SSPDIs stored in SSPD store 160 conform to a standardized format (e.g., a normalized or canonical representation) internal to managed services provisioning system 130 and follow a particular schema which, in one embodiment, can be a modified JSON schema.

In some embodiments, the structure of a SSPDI can be realized in a JSON document. Skilled artisans appreciate that JSON is a textual format that can describe any kind of data structure. The JSON schema is used to create service-specific provisioning descriptors which, as explained above, are used to dynamically create SPIs, which are used to collect values for service parameters (service-specific provisioning information), which are used to create SSPDIs, which, in turn, are used to process information in performing the requested services. This streamlined, unified provisioning methodology leverages industry standards and technologies and intelligently and yet flexibly connects many different client systems and different backend systems.

Skilled artisans also appreciate that each SSPDI thus created may go through a review, correction, validation, and approval process to prepare for deployment. The SSPDI is formatted according to the parameter schema to the service. Managed services provisioning system 130 may request the backend system that provides the service to validate the SSPDI. As any validation error happens, managed services provisioning system 130 may generate a notification or otherwise notified an authorized user (e.g., a SSPDI technician or reviewer) for correction. Once that service has gone through this process, it can be saved. Contrastingly, previously, a technician or service developer would need to log in to many different systems and re-enter all the information that each system needed to make that flow of data work.

Until they are ready, SSPDIs for a client system's requested services may be stored and worked on in a staging environment. After they are approved, the SSPDIs may be deployed from, for example, managed services provisioning system 130 of FIG. 1 to backend systems 180A . . . 180N. Backend systems 180A . . . 180N may be operable to process information received from the client system using these SSPDIs to provide the requested services for the client system.

Each client system of an enterprise customer (e.g., Entity A shown in FIG. 1) may have a unique set of services that they use to communicate with their clients and/or other entities (e.g., Entities N shown in FIG. 1) through managed services provisioning system 130. The above-described unified approach creates a generic, single point of configuration that accepts a description of configuration requirements generated by each service. Managed services provisioning system 130 collects information needed for each service, reformats the information into a format that conforms to the service, and sends the formatted information to the backend system that provides the service.

For example, managed services provisioning system 130 may receive incoming data such as an email or document over a communications interface (e.g., File Transfer Protocol (FTP) network interface) from a client system 111 operating in enterprise computing environment 110. The incoming data from enterprise computing environment 110 can come in different formats. Furthermore, the incoming data may have a destination (receiving device) which has a set of requirements on what it can accept. Depending upon the requirements, the input data may be sent to different paths and eventually delivered to the destination.

The incoming data from client system 111 can itself be associated with different requirements. For example, if it is an email, the email address is required. If it's a FTP document, an email address is not needed, but the address of the FTP server is required, as well as credentials to log in to the FTP server, the format of the document, and parameters specifying how to convert it to a format that can be understood by managed services provisioning system 130, how to convert to a format that a receiver at the destination can accept, and how to deliver that to the destination, etc.). Each step along the way has information that may need to be gathered (collected). As illustrated in FIG. 4, service configuration interface 400 can act as a central portal where all the services a customer desires can be configured in an efficient, unified manner. Each service has its own SSPDI particular to the service's requirements. A SSPDI, in this case, contains the necessary configuration information that a service needs from a client system.

Once the configuration information is entered, not just the customer (e.g., Entity A shown in FIG. 1), but all of the customer and the customer's clients that are enrolled in this transaction may communicate data through managed services provisioning system 130. That is, a service can be provisioned in a document transaction oriented or "document-centric" manner, between Entity A and whichever Entities N enrolled in the transaction relative to Entity A. Once a service has gone through this unified service provisioning process, which can take less than a day, it can be ready to go live (i.e., the service is provisioned).

At deployment time, all SSPDIs that have been approved can be sent to backend systems that provide the services (provisioned). Even after deployment, managed services provisioning system 130 can pull a deployed SSPDI back from a backend system, render (generate) a corresponding SPI to allow a customer (or an authorized user for the customer) to change or modify the SSPDI (step 305), modify the SSPDI based on the input received via the SPI (step 310), store it (step 315), and send it to back to the backend system once it is approved for re-deployment (step 320).

Figure 6:
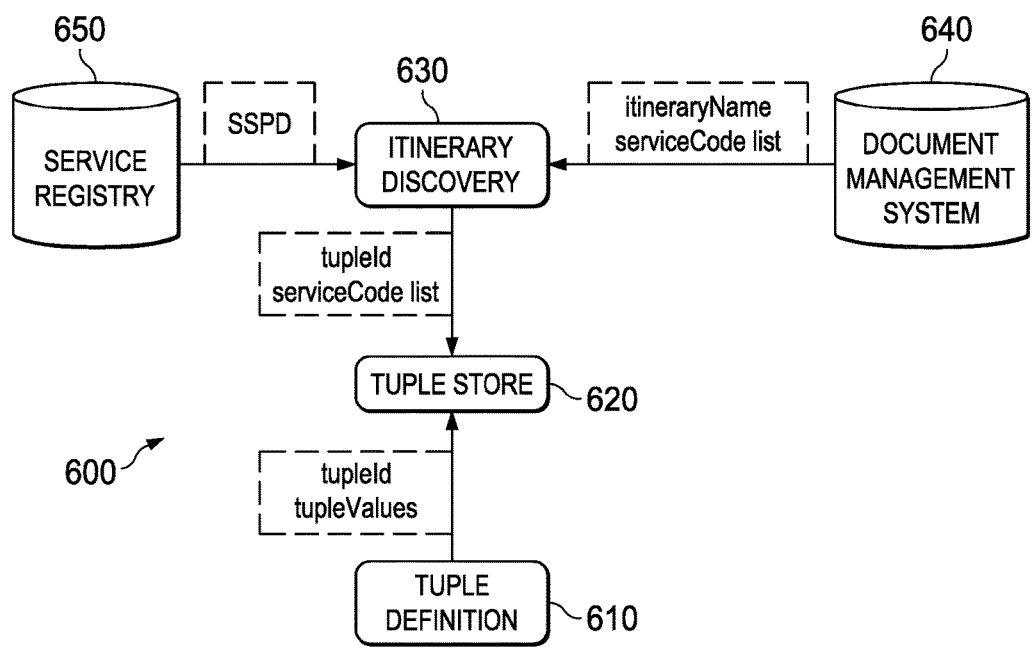
FIG. 6 depicts a diagrammatic representation of an example of an itinerary discovery process according to some embodiments.

FIG. 6 depicts a diagrammatic representation of an example of itinerary/tuple assignment process 600. As described above, a tuple describes a data flow particular to a sender, a receiver, and a document type, as defined by tuple definition 610. Tuples, each having an identifier (e.g., a tupleId) and particular values (e.g., tupleValues) for the data fields (e.g., sender, receiver, docType), may be persisted in tuple store 620. A tuple may be associated with or assigned to an itinerary by docType. This can be done via a service provisioning tool or renderer represented in FIG. 6 as itinerary discovery 630. As illustrated in FIG. 6, itinerary discovery 630 can operate to bind, associate, or otherwise assign an itinerary (which can be defined via document management system 640) that specifies services (which can be services registered with service registry 650) to a particular tuple. In some embodiments, itinerary/tuple assignment process 600 may be performed, for example, in response to tuple 401b being selected from Tuple Grid 401 via service configuration interface 400 shown in FIG. 4.

Figure 7:
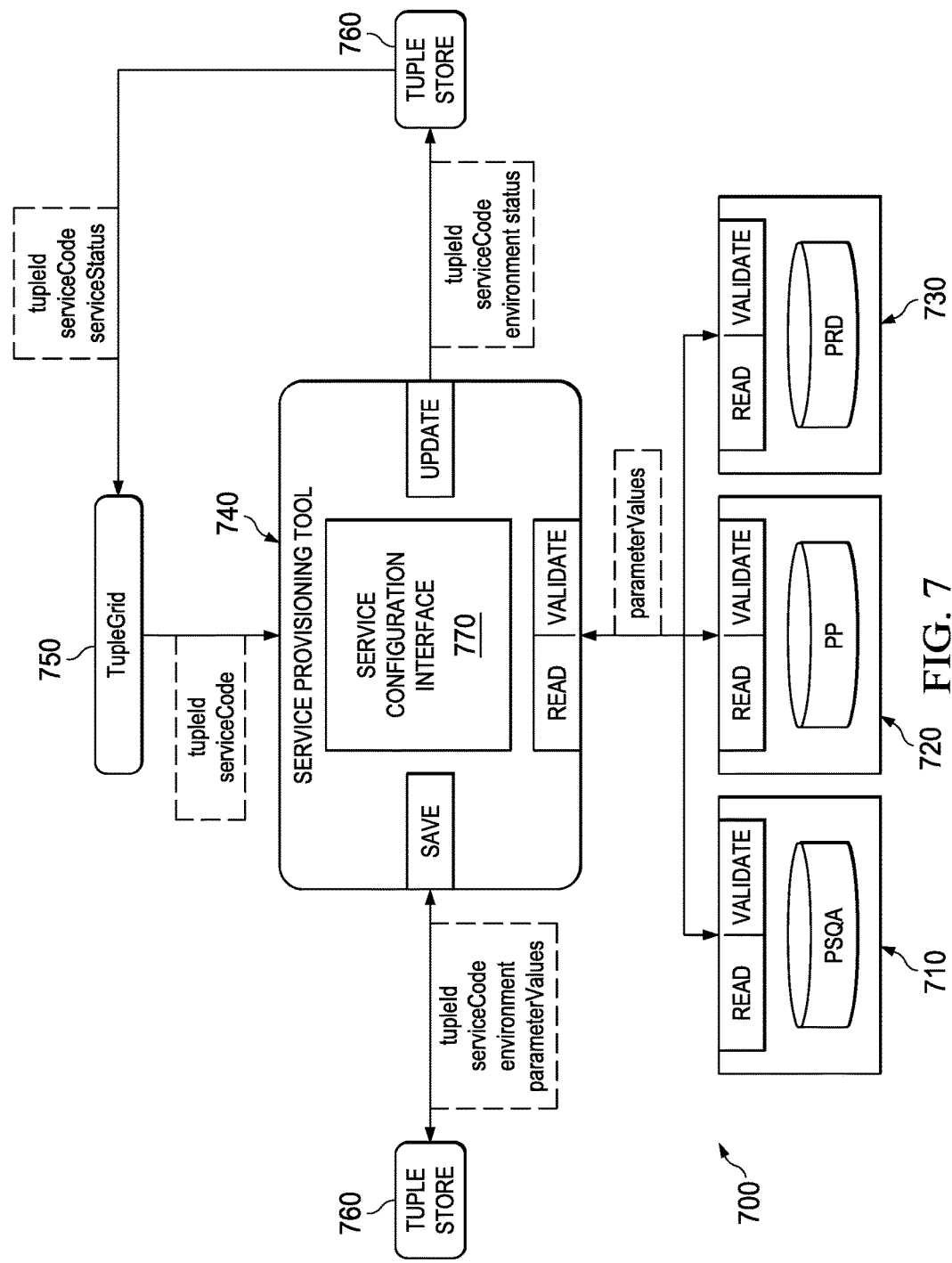
FIG. 7 depicts a diagrammatic representation of an example of a service provisioning process according to some embodiments.

FIG. 7 depicts a diagrammatic representation of an example of service provisioning process 700. In this example, professional services question and answer (PSQA) environment 710, pre-production (PP) environment 720, and production (PRD) environment 730 may each interact with service provisioning tool 740. In generating Tuple Grid 750 for presentation on a user device via service configuration interface 770, data including tupleId, serviceCode, and serviceStatus may be retrieved from tuple store 760. Responsive to user interaction with service configuration interface 770 (e.g., update, save), tupleId, serviceCode, environment parameterValues or status may be persisted in tuple store 760.

Figure 8:
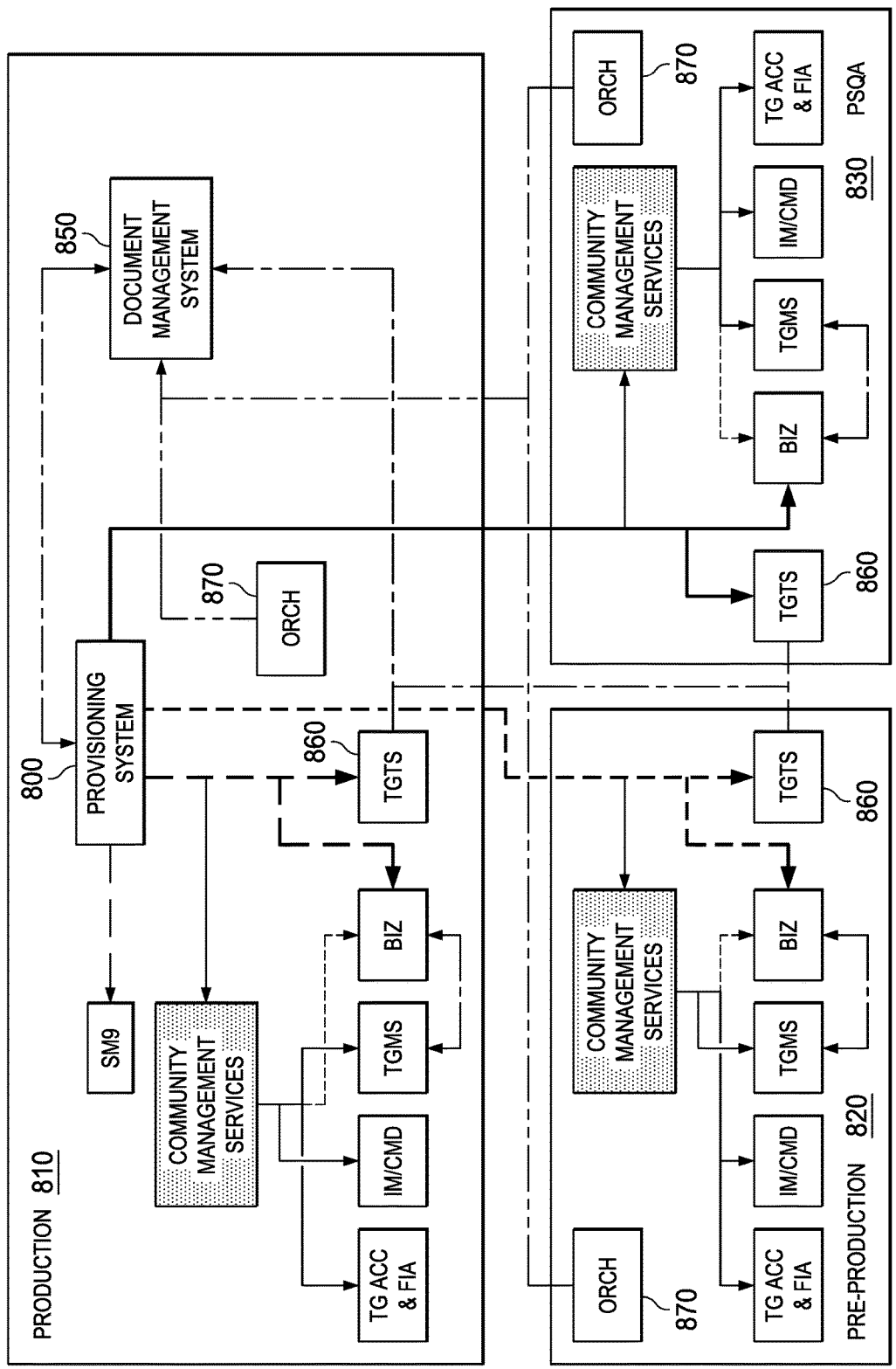
FIG. 8 depicts a diagrammatic representation of an example of a managed services provisioning system integrated with various computing environments according to some embodiments.

FIG. 8 depicts a diagrammatic representation of an example of managed services provisioning system 800 integrated with various computing environments (or stages, from the perspective of service-readiness) including production environment 810, pre-production environment 820, and PSQA environment 830. Environments 810, 820, and 830 may each communicate with document management system 850 and TGTS 860 via orchestration logic (ORCH) 870. Other components operating in environments 810, 820, and 830 are outside the scope of this disclosure and thus are not further described herein. Generally, a service solution for a client system associated with an enterprise customer of an electronic information exchange platform on which managed services provisioning system 800 operates may begin with creation of a process context in PSQA environment 830 for tuple-driven data processing (e.g., sender, receiver, docType). The process context thus created can be promoted into pre-production environment 820 and, when approved, to production environment 810, to ensure uniformity with respect to internal data representation. Predictability and quality of service can be enhanced due to this internal data uniformity throughout the electronic information exchange platform. Because the data does not have to be manually re-entered in each environment, typographical errors can be reduced as well as the cost of data reentry.

Figure 9:
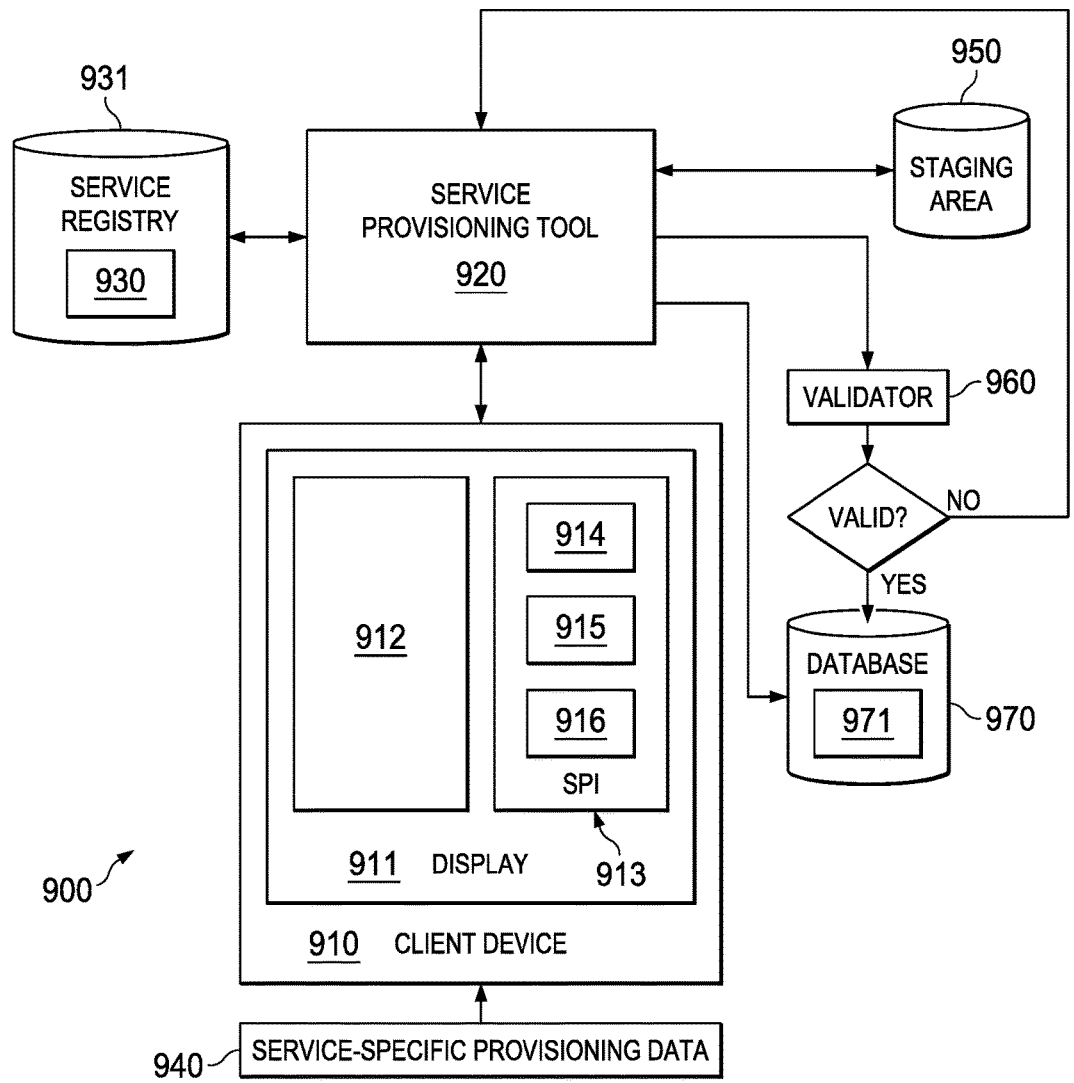
FIG. 9 depicts a diagrammatic representation of an example of a service-specific data provisioning instance creation process according to some embodiments.

FIG. 9 depicts a diagrammatic representation of an example of service-specific data provisioning instance creation process 900. In this example, client device 910 includes display 911 for displaying service configuration interface 912. Selecting a service via service configuration interface 912 causes service provisioning tool 920 to obtain SSPD 930 for the selected service from service registry 931. Service provisioning tool 920 then uses SSPD 930 to generate SPI 913. A user such as an implementer then inputs service-specific provisioning data 940 via SPI 913 displayed on client device 910. Responsive to a command or instruction from the implementer (e.g., the implementer selecting "save" function 914 of SPI 913), service provisioning tool 920 may store service-specific provisioning data 940 in database 950 (also referred to as a staging area) on client device 910 or a storage device external to client device 910. Likewise, responsive to a "validate" command or instruction from the implementer (via function 915 of SPI 913), service provisioning tool 920 may operate to communicate service-specific provisioning data 940 to validator 960. If validator 960 determines that service-specific provisioning data 940 is valid, service-specific provisioning data 940 is stored in database 970 as SSPDI 971. If service-specific provisioning data 940 is not valid, validator 960 may indicate to service provisioning tool 920 that service-specific provisioning data 940 has failed validation. Validator 960 may also provide a reason as to why service-specific provisioning data 940 failed. Service provisioning tool 920 may operate to display the reason(s). If validation is performed on a batch manner, a list of failed entries may be provided by validator 960 and service provisioning tool 920 may operate to identify the failed entries. Suppose service-specific provisioning data 940 is ready for deployment, service provisioning tool 920 may operate to communicate service-specific provisioning data 940 to a backend system operating in a production environment as described above (e.g., responsive to a "provision" command or instruction from the implementer via function 916 of SPI 913).

Figure 10:
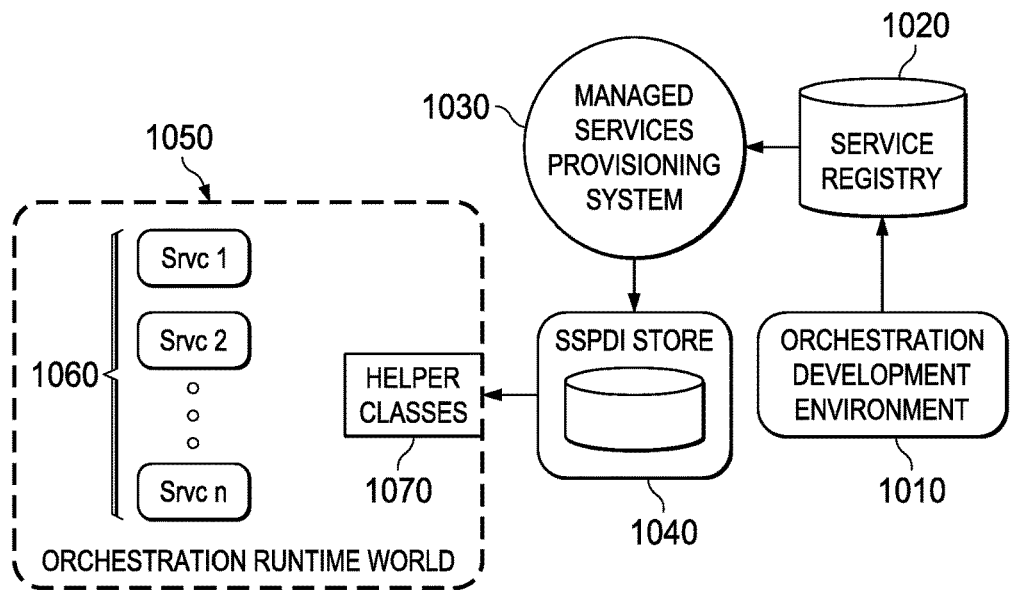
FIG. 10 depicts a diagrammatic representation of an example of a service-specific data provisioning instance life cycle according to some embodiments.

FIG. 10 depicts a diagrammatic representation of an example of a service-specific data provisioning instance life cycle. In FIG. 10, SSPDs may be defined in orchestration development environment 1010 and stored in service registry 1020 as described above. Such SSPDs may be used by managed services provisioning system 1030 in creating one or more SSPDIs for processing tuples according to a service solution particularly configured for a client system. The SSPDIs are stored in SSPDI store 1040 until needed by a service at runtime. For example, in orchestration runtime environment or world 1050, each of services 1060 may retrieve, with the assistance of one or more helper classes 1070, a SSPDI from SSPDI store 1040 for tuple processing.

Figure 11:
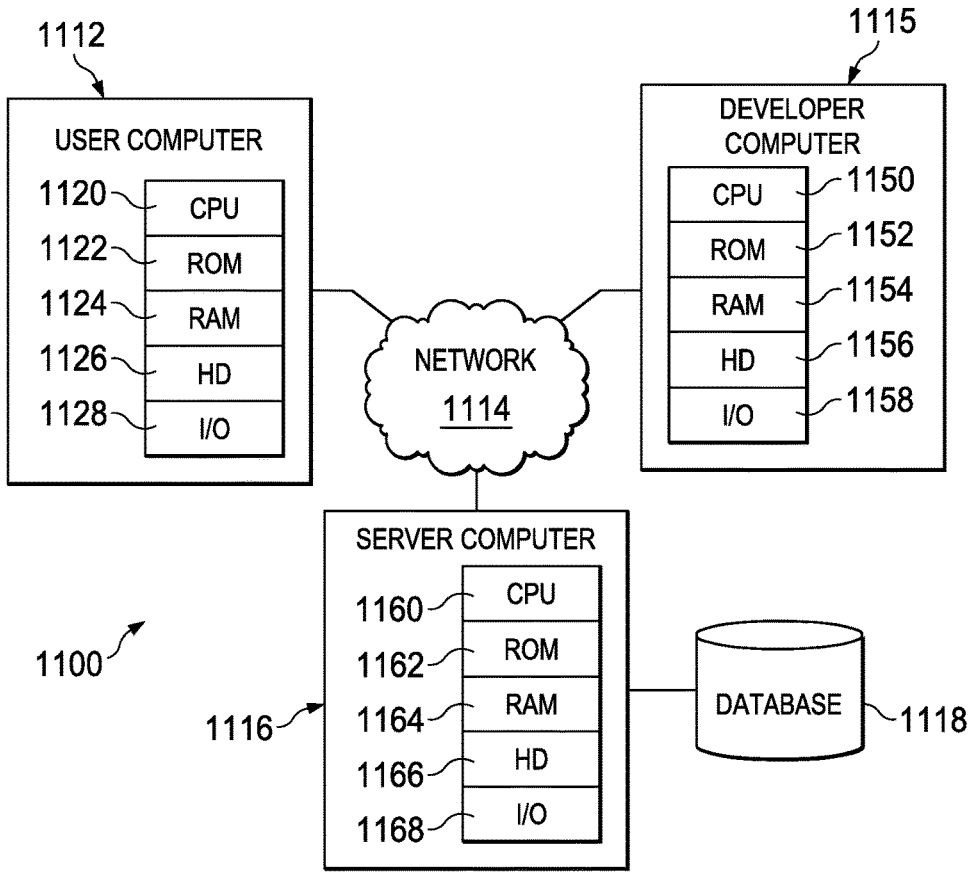
FIG. 11 depicts a diagrammatic representation of an example of an enterprise computing environment where embodiments disclosed can be implemented.

FIG. 11 illustrates an exemplary architecture for network computing environment 1100 that includes network 1114 that can be bi-directionally coupled to customer user computer 1112, service developer computer 1115, and server computer 1116. Server computer 1116 can be bi-directionally coupled to database 1118. Network 1114 may represent a combination of wired and wireless networks that network computing environment 1100 may utilize for various types of network communications known to those skilled in the art.

For the purpose of illustration, a single system is shown for each of customer user computer 1112, service developer computer 1115, and server computer 1116. However, within each of customer user computer 1112, service developer computer 1115, and server computer 1116, a plurality of computers (not shown) may be interconnected to each other over network 1114. For example, a plurality of customer user computers 1112 and a plurality of service developer computers 1115 may be coupled to network 1114. Customer user computers 1112 may include data processing systems for communicating with server computer 1116. Service developer computers 1115 may include data processing systems for individuals whose jobs may require them to configure services used by customer user computers 1112 in network computing environment 1100.

Customer user computer 1112 can include central processing unit ("CPU") 1120, read-only memory ("ROM") 1122, random access memory ("RAM") 1124, hard drive ("HD") or storage memory 1126, and input/output device(s) ("I/O") 1128. I/O 1129 can include a keyboard, monitor, printer, electronic pointing device (e.g., mouse, trackball, stylus, etc.), or the like. Customer user computer 1112 can include a desktop computer, a laptop computer, a personal digital assistant, a cellular phone, or nearly any device capable of communicating over a network. Service developer computer 1115 may be similar to customer user computer 1112 and can comprise CPU 1150, ROM 1152, RAM 1154, HD 1156, and I/O 1158.

Likewise, server computer 1116 may include CPU 1160, ROM 1162, RAM 1164, HD 1166, and I/O 1168. Server computer 1116 may include one or more backend systems configured for providing a variety of services to customer user computers 1112 over network 1114. One example of such a backend system can be a database management system for database 1118. Many other alternative configurations are possible and known to skilled artisans.

Each of the computers in FIG. 11 may have more than one CPU, ROM, RAM, HD, I/O, or other hardware components. For the sake of brevity, each computer is illustrated as having one of each of the hardware components, even if more than one is used. Each of computers 1112, 1115, and 1116 is an example of a data processing system. ROM 1122, 1152, and 1162; RAM 1124, 1154, and 1164; HD 1126, 1156, and 1166; and database 1118 can include media that can be read by CPU 1120, 1150, or 1160. Therefore, these types of memories include non-transitory computer-readable storage media. These memories may be internal or external to computers 1112, 1115, or 1116.

Portions of the methods described herein may be implemented in suitable software code that may reside within ROM 1122, 1152, or 1162; RAM 1124, 1154, or 1164; or HD 1126, 1156, or 1166. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a special purpose computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A managed services provisioning system, comprising:
    a processor;
    a service registry storing registration information for a plurality of services managed by an electronic information exchange platform, the plurality of services provided by disparate backend systems of the electronic information exchange platform, each service of the plurality of services having a unique set of requirements defining acceptable data formats;
    a non-transitory computer readable medium; and
    stored instructions embodied on the non-transitory computer readable medium and translatable by the processor to:
        receive a service-specific provisioning descriptor associated with a service from a backend system of the electronic information exchange platform;
        store the service-specific provisioning descriptor in a service-specific provisioning descriptor store;
        register the service in the service registry;
        responsive to service configuration through a first user interface, dynamically generate a second user interface for entry of service-specific provisioning information based at least in part on the service-specific provisioning descriptor associated with the service, the service configuration associated with a client system communicatively connected to the electronic information exchange platform and external to the managed services provisioning system;
        generate a service-specific provisioning data instance using the service-specific provisioning information received through the second user interface, the service-specific provisioning data instance generated in a standardized or unified format internal to the managed services provisioning system, the service-specific provisioning data instance specific to providing the service to the client system;
        store the service-specific provisioning data instance in a service-specific provisioning data instance store; and
        deploy the service-specific provisioning data instance to the backend system, wherein the backend system is operable to provide the service to the client system through the electronic information exchange platform by using the service-specific provisioning data instance to process information received from the client system.

2. The managed services provisioning system of claim 1, wherein the service configuration is for configuring a set of services of the plurality of services for the client system in communicating with a plurality of other client systems through the managed services provisioning system.

3. The managed services provisioning system of claim 2, wherein the stored instructions are further translatable by the processor to repeat dynamic generation of a service provisioning interface for each service of the set of services for the client system.

4. The managed services provisioning system of claim 3, wherein a corresponding service-specific provisioning data instance is generated for each service of the set of services for the client system.

5. The managed services provisioning system of claim 3, wherein the service-specific provisioning data instance is one of a plurality of service-specific provisioning data instances generated for the set of services for the client system and wherein the service-specific provisioning data instance is deployed to the backend system together with the plurality of service-specific provisioning data instances for the client system.

6. The managed services provisioning system of claim 1, wherein the stored instructions are further translatable by the processor to:
    subsequent to deployment of the service-specific provisioning data instance to the backend system, receive the service-specific provisioning data instance from the backend system;
    generate a service provisioning interface for the service-specific provisioning data instance;
    present the service provisioning interface on a user device;
    receive modified service-specific provisioning information through the service provisioning interface;
    update the service-specific provisioning data instance based on the modified service-specific provisioning information received through the service provisioning interface; and
    send the service-specific provisioning data instance updated for the service to the backend system, wherein the backend system is operable to provide the service to the client system by using the service-specific provisioning data instance updated for the service to process information received from the client system.

7. The managed services provisioning system of claim 1, wherein the stored instructions are further translatable by the processor to:

determine whether the service-specific provisioning information received through the second user interface is valid.

8. The managed services provisioning system of claim 7, wherein the stored instructions are further translatable by the processor to:
generate a notification of a validation error in association with the service-specific provisioning information received through the second user interface.

9. The managed services provisioning system of claim 1, wherein the service-specific provisioning descriptor associated with the service defines a data structure having a set of fields necessitated by the service.

10. The managed services provisioning system of claim 1, wherein the service-specific provisioning data instance for the service implements a particular JavaScript Object Notation (JSON) schema.

11. The managed services provisioning system of claim 10, wherein the service-specific provisioning data instance comprises a JSON string.

12. The managed services provisioning system of claim 10, wherein the service-specific provisioning data instance comprises a JSON document.

13. A computer program product for managed services provisioning, the computer program product comprising a non-transitory computer readable medium storing instructions translatable by a processor of a managed services provisioning system to perform:
storing registration information for a plurality of services managed by an electronic information exchange platform, the plurality of services provided by disparate backend systems of the electronic information exchange platform, each service of the plurality of services having a unique set of requirements defining acceptable data formats;
receiving a service-specific provisioning descriptor associated with a service from a backend system of the electronic information exchange platform;
storing the service-specific provisioning descriptor in a service-specific provisioning descriptor store;
registering the service in the service registry;
responsive to service configuration through a first user interface, dynamically generating a second user interface for entry of service-specific provisioning information based at least in part on the service-specific provisioning descriptor associated with the service, the service configuration associated with a client system communicatively connected to the electronic information exchange platform and external to the managed services provisioning system;
generating a service-specific provisioning data instance using the service-specific provisioning information received through the second user interface, the service-specific provisioning data instance generated in a standardized or unified format internal to the managed services provisioning system, the service-specific provisioning data instance specific to providing the service to the client system;
storing the service-specific provisioning data instance in a service-specific provisioning data instance store; and
deploying the service-specific provisioning data instance to the backend system, wherein the backend system is operable to provide the service to the client system through the electronic information exchange platform by using the service-specific provisioning data instance to process information received from the client system.

14. The computer program product of claim 13, wherein the service configuration is for configuring a set of services of the plurality of services for the client system in communicating with a plurality of other client systems through the managed services provisioning system.

15. The computer program product of claim 14, wherein a corresponding service-specific provisioning data instance is generated for each service of the set of services for the client system.

16. The computer program product of claim 13, wherein the non-transitory computer readable medium further stores instructions translatable by the processor to perform:
subsequent to deployment of the service-specific provisioning data instance to the backend system, receiving the service-specific provisioning data instance from the backend system;
generating a service provisioning interface for the service-specific provisioning data instance;
presenting the service provisioning interface on a user device;
receiving modified service-specific provisioning information through the service provisioning interface;
updating the service-specific provisioning data instance based on the modified service-specific provisioning information received through the service provisioning interface; and
sending the service-specific provisioning data instance updated for the service to the backend system, wherein the backend system is operable to provide the service to the client system by using the service-specific provisioning data instance updated for the service to process information received from the client system.

17. The computer program product of claim 13, wherein the non-transitory computer readable medium further stores instructions translatable by the processor to perform:
determining whether the service-specific provisioning information received through the second user interface is valid.

18. The computer program product of claim 13, wherein the service-specific provisioning descriptor associated with the service defines a data structure having a set of fields necessitated by the service.

19. The computer program product of claim 13, wherein the service-specific provisioning data instance for the service implements a particular JavaScript Object Notation (JSON) schema.

20. The computer program product of claim 19, wherein the service-specific provisioning data instance comprises a JSON string or a JSON document.

* * * * *